United States Patent [19]
Cronch et al.

[11] Patent Number: 5,107,378
[45] Date of Patent: Apr. 21, 1992

[54] ADAPTIVE MAGNETIC RECORDING AND READBACK SYSTEM

[75] Inventors: Robert D. Cronch, Edmond, Okla.; Dennis C. Stone, Northgate, Calif.

[73] Assignee: Magnetic Peripherals, Inc., Minneapolis, Minn.

[21] Appl. No.: 607,646

[22] Filed: Oct. 29, 1990

Related U.S. Application Data

[63] Continuation of Ser. No. 454,729, Dec. 21, 1989, abandoned, which is a continuation of Ser. No. 874,029, Jun. 13, 1986, abandoned.

[51] Int. Cl.$^5$ .............................................. G11B 5/09
[52] U.S. Cl. .................................. 360/45; 360/46; 360/65
[58] Field of Search ............................................ 360/45

[56] References Cited

U.S. PATENT DOCUMENTS 4,635,141  1/1987  Coulter ............................. 360/45

Primary Examiner—Vincent P. Canney
Attorney, Agent, or Firm—Limbach & Limbach

[57] ABSTRACT

A method and related system for use with a disk drive are disclosed for adjusting the current level emanating from a read/write head during recording of data onto a disk to compensate for differences in read/write head and disk relationships. Also, a method and related system are disclosed for determining the optimum slimming constant to be utilized to minimize data pulse peak shifts to compensate for differences in read/write head and disk relationships.

3 Claims, 2 Drawing Sheets

\* Other sector sizes possible
\*\* Sync, Zero, and Data frames 32 bytes long

ADAPTIVE MAGNETIC RECORDING AND READBACK SYSTEM

This is a continuation of co-pending application Ser. No. 07/454,729 filed on Dec. 21, 1989, now abandoned, which is a continuation of copending application Ser. No. 874,029 filed on Jun. 13, 1986, now abandoned.

BACKGROUND OF THE INVENTION

The present invention relates to a magnetic recording and readback system for use within a disk drive and, more particularly, to such a system that includes readback compensation circuitry to minimize variations in read/write and disk relationships.

In disk drives, usually utilized for storing information in conjunction with a computer, a storage device or "disk" is rotated at high speeds and a read/write head is passed across the surface of the disk without actually touching the surface. Due to the high disk rotation speeds, for example greater than 2,500 RPM, and the relatively small sizes of the disks, for example 5¼ D, the tolerances of the equipment must be very rigidly controlled. However, variations can exist between individual disks and individual read/write heads, so some variation in data recording and reading quality can exist because of variations in the disk and read/write head relationships. In the past, there have been no methods or systems to compensate for these variations, i.e. to "adapt" to the variations. Two instances where these variations become important are in adjusting the write current level and in adjusting the data pulse widths.

In a disk drive, the read/write head is supported in a manner to move very close to the surface of the spinning disk. Air currents generated by the spinning disk cause the read/write head to float or "fly" above the surface. The height the read/write head flies above the surface of the disk is critical, i.e. the amount of current used to record or write data onto the disk is very critical so the height of the read/write head above the surface affects the amount of current optimally utilized. A particular read/write head flies above the surface of a particular disk at different heights depending upon the location above the surface. Generally, the read/write head flies higher above the surface adjacent the outer radius of the disk and flies lower above the surface adjacent the inner radius of the disk. Therefore, a higher write current is utilized for the outer positions than at the inner positions of the disk.

In the past, the adjustments to the write current levels for particular read/write head and disk combinations were averaged and then a final, single set of write current levels were included within the disk drives circuitry. Problems with data interpretation have occurred because the adjustments to the write current levels were at best a compromise. Further, if a head-disk assembly (HDA) was ever changed, the correct write current level for the new HDA could be significantly different than that which was "hardwired" into the disk drives logic circuitry, thereby, increasing the disk data errors.

The other instance of where the variations become important is in adjusting the data pulse peaks. On a disk, the data is stored in the form of magnetic flux changes of one of two directions. When the read/write head passes over the disk, the transducer coil in the head is detecting magnetic direction shifts to generate an analog signal. If in a certain time window or cell a magnetic flux change has occurred then a signal or "pulse" is generated, again in analog form. The peaks of the pulses are detected and converted to digital form that corresponds to bytes of data for use within a programmable digital computer. Because of the relatively small size of the disks (5¼" D), the small size of the magnetic flux cells and the very high rotational speed of the disk, the detection of the pulse peaks is critical. On a disk, the data pulse peaks at an inner radius position are harder to detect because the pulse peaks are closer together and the pulses are wider than at the outer radius position, thus data errors can occur.

To compensate for the data pulse peak crowding or "shifting" a form of pulse peak amplitude filtering has been employed to reduce the width of the pulses so the data pulse peaks can be more easily detected. The amplitude filtering has been in the form of cosine equalization, which is hereby defined as the collection of circuit components whose purpose it is to achieve pulse width reduction by adding and subtracting even harmonics of the signal with itself. The transfer function, F(W), of this equalizer is expressed as $F(W) = 1 - K \cos(W\tau)$ which defines the ratio of output to input characteristics in terms of frequency components of angular frequency, W. The terms K and $\tau$ refer to the slimming constant and delay, respectively. The delay, $\tau$, is usually fixed and the value of the slimming constant, K, is varied to achieve the correct amount of slimming for a head/disk combination.

In the past, the optimum amount of pulse width reduction or "slimming" for various locations on a disk have been averaged and the best compromise values have been stored or "hardwired" into the disk drive's circuitry. Again, as described above, if an HDA is changed, the optimum slimming values cannot be changed so even more data errors can become likely.

There exists a need for a method and related system whereby the correct write current levels and/or the correct slimming values for a particular read/write head and disk combination can be inputted into the disk drive's circuitry to "adapt" the disk drive's circuitry to the particular HDA.

SUMMARY OF THE INVENTION

The present invention has been developed to overcome the foregoing disadvantages and meet the above described needs. The present invention generally comprises a method and related system for adaptively adjusting the current level emanating from a read/write head during recording of data onto a disk-type storage device. Specifically, the method for adjusting the write current level comprises reading certain write current parameters from at least one designated location on the disk; upon a write command, calculating the optimum write current level, utilizing the write current parameters, for recording data onto a particular location on the disk; and recording the data onto the particular location on the disk at the optimum current level.

The method for reducing data pulse peak shifts which can be utilized alone or with the method for adjusting the write current level, comprises reading data reading parameters from at least one designated location on the disk; upon a read command, determining the optimum slimming constant, utilizing the data reading parameters, to be utilized to minimize data pulse peak shifts at a particular location on the disk; and reading the data from the particular location on the disk utilizing the optimum slimming constant.

The advantages and objects of the invention will become evident from the following detailed description of the drawings when read in connection with the accompanying drawings which illustrate preferred embodiments of the invention.

The present invention comprises a method and related system for adaptively adjusting the current level emanating from a read/write head during recording of data onto a disk-type storage device to compensate for variations in read/write head height variations for any head/disk assembly (HDA). Also, the present invention comprises a method and related system for adaptively reducing data pulse peak shifts that can be used alone or with the system for adjusting the write current level.

The features of the present invention depend upon the ability to store and retrieve data obtained during the manufacturing process for use by the electronics within a disk drive. The data stored comprises information or parameters that conveys disk drive configuration information and allows the disk drive to be internally adapted to reduce its tolerance dependence by adapting to individual head/disk variables. To accomplish this the information is to be stored, in a form described in detail later, on the disk in at least one designated locations. In one embodiment of the present invention, the adaptive information is stored outside of the exterior data tracks, i.e. the guard band. Preferably, each disk in a multi-disk drive has such information stored thereon so that each read/write head can access the adaptive information; however, any head/disk or combinations of head/disks can be utilized as desired.

Figure 1:
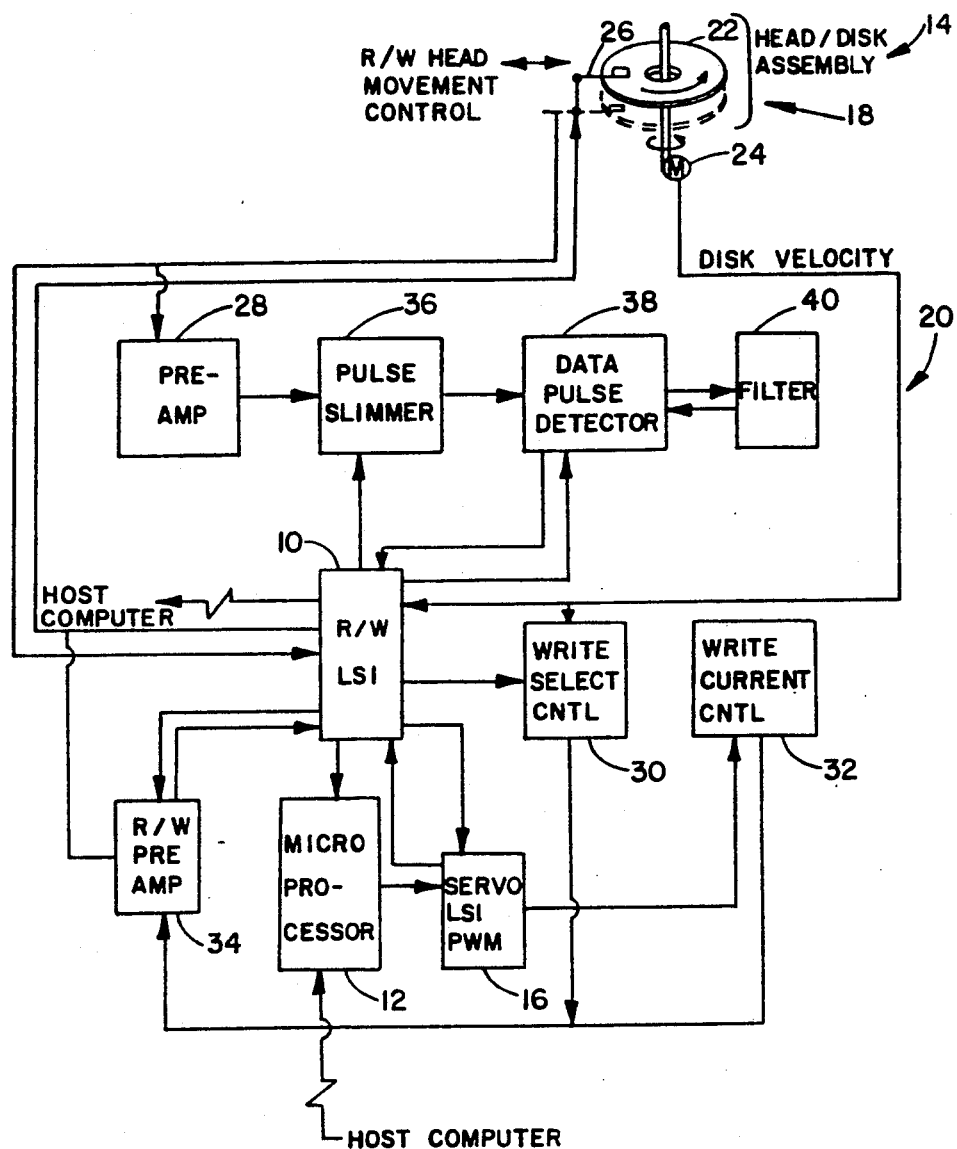
FIG. 1 is a schematic view of system components utilized in an Adaptive Magnetic Recording and Readback System embodying the present invention.

As shown in FIG. 1, the major features of one embodiment of the present invention are a read/write LSI 10 and a microprocessor 12. The R/W LSI is a solid state circuit or chip to support the writing and reading of adaptive information to/from the outer guard band data track of the head/disk assembly (HDA) 14 uner the control of the microprocessor 12. The R/W LSI controls normal read/write the adaptive information. In addition the R/W LSI 10 contains circuitry to decode the sequential bytes of adaptive information, store them in an internal register and then transfer them serially to the microprocessor 12.

The microprocessor 12 and associated firmware (not shown) control the use of the adaptive information. The microprocessor 12 controls the use of the drive configuration data, write current levels and adjustments, and the adaptive slimming. Also, the microprocessor 12 controls the data transfers, any error recovery sequencing, data processing and the like. NOTE: The other features shown in FIG. 1 will be described later.

DATA FORMAT

Figure 2:
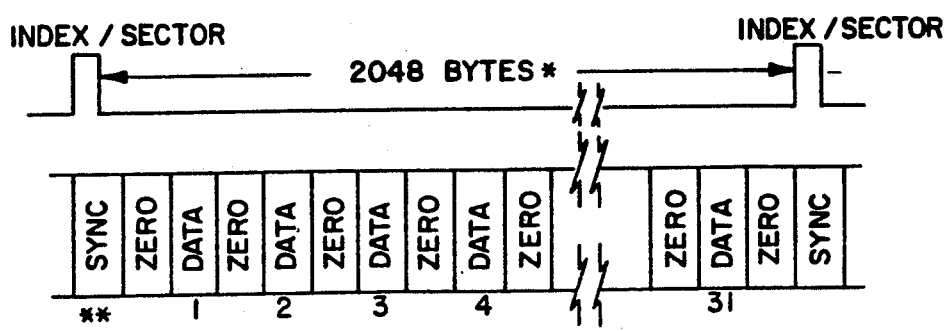
FIG. 2 is a schematic view of the guard band data format.

The adaptive information, called parameters or adaptive data, is written in sector format containing a complete copy of all needed information. Within each "sector" or designated location the data will be written in a format that makes data recovery easier but is read and written as NRZ (non return to zero) data across the interface. Starting at an index, the data is recorded on the disk repeatedly around the guard band data tracks for as many sectors as will be desired, usually as many as will fit. In general, sector size is limited by a 12 bit byte counter located in the servo LSI 16, resulting to a maximum of about 4096 bytes per sector. For example, 20,880 bytes per data track would accomodate about 5 duplications of the adaptive data. The data format within each sector is illustrated in FIG. 2, where each sector is made up of sync, zero, and data frames, each representing 32 bytes of NRZ data. Each sector contains one sync frame, followed by one zero frame and one data frame for each byte of adaptive information. To accomodate the serial data transfer between disk drive components, all data should be written with the least significant bit first.

Figure 3:
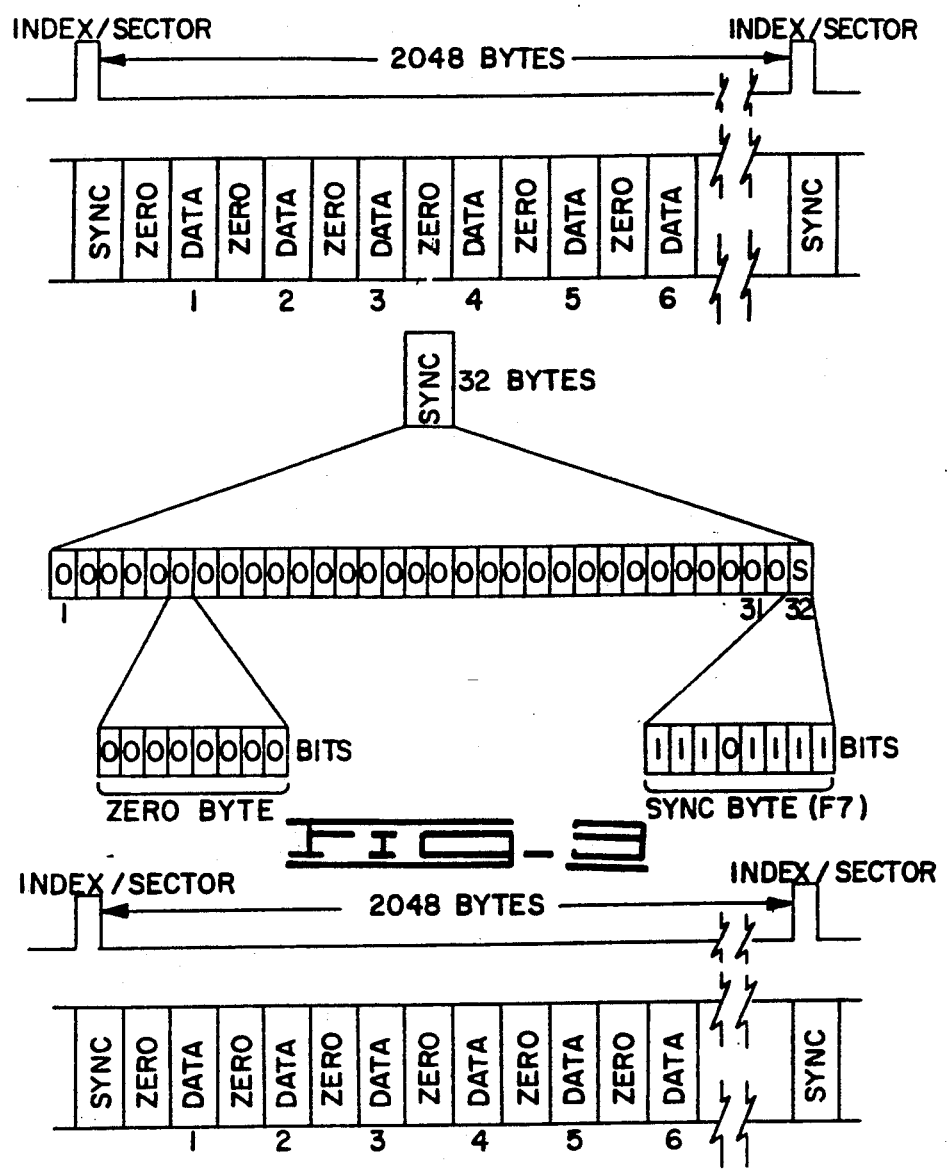
FIG. 3 is a schematic view of the sync frame data format.

The sync frame is located at the beginning of each sector and starts at the rising edge of the sector pulse. The format of the sync frame is shown in FIG. 3, and is comprised of about 31 bytes of zeros followed by a sync bit, F7. The purpose of the sync frame is to provide a long phase lock oscillator (PLO) sync field and a synchronization byte used by the adaptive slimming circuitry in the R/W LSI 10. The sync byte is written with the least significant bit first.

The zero frame is written prior to each data frame and comprises about 32 bytes of consecutive zeros. The number of zero frames per sector depends upon the sector size. The zero frame allows the microprocessor 12 time to serially input data with adequate time tolerance before shift register control is switched to the next data field. Frame data is all zeros in order to provide a constant frequency pattern on which the PLO can lock and stabilize before encountering actual data.

Figure 4:
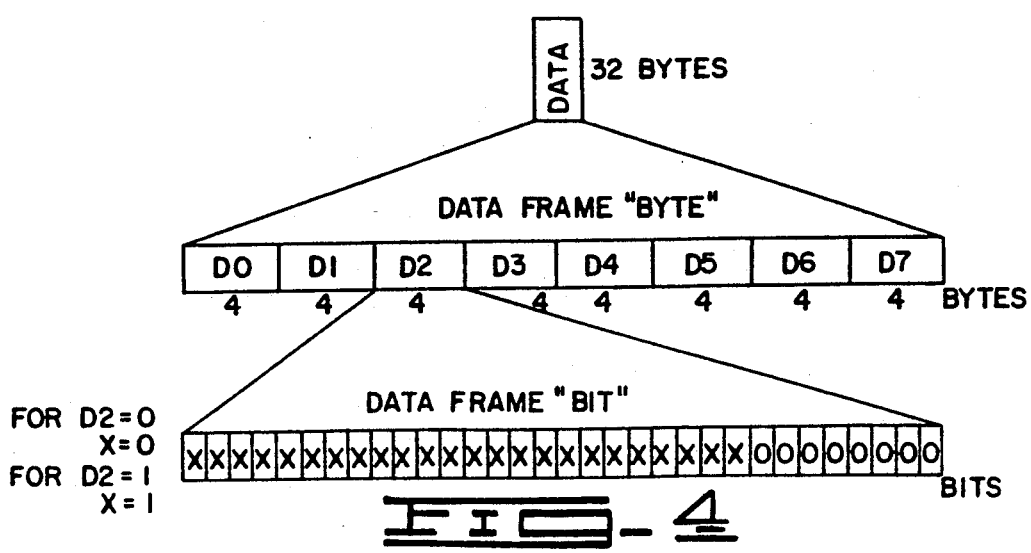
FIG. 4 is a schematic view of the data frame data format.

FIG. 4 illustrates the format of the data frame which contains one byte of adaptive information comprising about 8 bits. Each data frame bit comprises about 4 NRZ bytes (32 NRZ bits). The length of each bit is chosen to reduce sensitivity to disk defects and allow the processor time to process information. A zero bit is recorded as 32 NRZ zeros and one bit is 24 NRZ ones followed by 8 zeros to allow for errors in sector decode timing. A count of over 12 NRZ ones is interpreted as one bit. In total, a data frame represents 256 NRZ bits. The first data bit written is the least significant bit. Types of information that can be recorded within a data frame byte can include address, data, and check sum information.

DISK DRIVE OVERVIEW

Prior to describing the test systems and adaptive features of the present invention, a typical disk drive will be described. For the purpose of the present invention, the data is transferred at a rate of about 10 MHz and is encoded using 2, 7 run-length limited encoding technique to form the flux bit pattern that is "written" or recorded on the disk(s). This encoding technique is characterized by having a minimum of two and a maximum of about 7 flux cells between any two flux transitions. Each flux cell has a duration of about 50 nanoseconds, which is about half of the bit cell time of 100 nanoseconds. The 2, 7 encoding has two possilbe frame synchronizations. The valid synchronization occurs during PLO lock when the flux bit of an all zero pattern, i.e. 5 MHz, is aligned with the first cell of a two-flux cell frame. Invalid synchronization corresponds to that bit occuring in the other cell of the two-flux cell frame. Once synchronized, the frame synchronization remains valid until a PLO unlock occurs. Both the flux cell time and member of frame synchronizations are similar to what a 10 MHz MFM encoding scheme would have.

The disk drive generally depicted in FIG. 1 can be of any commercially available single or multi-disk disk drive. Such disk drive, indicated as number 18, includes a circuitry section 20 and the head/disk assembly (HDA) 14. The HDA 14 generally includes at least one disk-type data storage device 22 which is rotated by a high speed motor 24. At least one read/write head 26 is moved across or "flown" above the disk 22. The read/write head 26 can be of any commercially available variety and is controlled for forward/rearward movement in any known manner. A typical multi-disk drive can include nine disks 22 and up to eighteen read/write heads 26.

ADAPTIVE TEST SYSTEM

The adaptive test system is external to the disk drive as well the drive functions; it is a system used at the time of manufacturing the HDA for the correct and optimum parameters, for example, the adaptive write current levels and the slimming constants, associated with the particular head and disk can be determined and then stored on the disk guard bands.

For the write current, two adaptive data bytes of information are determined and then written on the outer guard bands of the disk(s). The first byte corresponds to the outer radius write current value(s) and the second byte corresponds to the inner radius write current value(s). The disk drive's circuitry, specifically the microprocessor 12, varies the write current level between these two values depending upon track address. The write current value(s) for the different track addresses can be varied linearly, exponentially, or in a step-rate manner as desired. The optimum outer and inner, and thus the in-between, radius write current levels are determined in the conventional manner, such as by head/media amplitude saturation curve data or corresponding head/media overwrite saturation data. Alternately or in combination with write correct saturation data, drive data window peak shift margin data may be used to determine the optimum write current profile.

For the adaptive slimming, the data pulse peak distribution for each location on each disk is determined using an algorithm that expresses the effects of pulse width and noise on peak shift distributions as the difference between the n th and the (100−n)th percentiles and cosine equilization (as described above). In one embodiment of the present invention, up to 16 levels of slimming or "slimming constants" can be utilized. The optimum slimming level for a particular location on a disk is that which results in the minimum quantity of slimming and the minimum distribution width. While the present discussion has indicated that each head/disk combination have a separate slimming value, other methods can be used, such as track address slimming alone or predefined track address slimming can be used.

The overall byte format for one embodiment of the present invention is shown in Table I.

TABLE 1

| Sector "Byte" No. | Four-Bit Nibble | |
|---|---|---|
| | Low Order | High Order |
| 1 Slimming | Reserved | Order Selection |
| 2 Data: | Hd 0, Trk 0 | Hd 0, Trk 341 |
| 3 | Hd 0, Trk 682 | Hd 0, Trk 1023 |
| 4 | Hd 1, Trk 0 | Hd 1, Trk 341 |
| 5 | Hd 1, Trk 682 | Hd 1, Trk 1023 |
| 6 | Hd 2, Trk 0 | Hd 2, Trk 341 |
| 7 | Hd 2, Trk 682 | Hd 2, Trk 1023 |
| 8 | Hd 3, Trk 0 | Hd 3, Trk 341 |
| 9 | Hd 3, Trk 682 | Hd 3, Trk 1023 |
| 10 | Hd 4, Trk 0 | Hd 4, Trk 341 |
| 11 | Hd 4, Trk 682 | Hd 4, Trk 1023 |
| 12 | Hd 5, Trk 0 | Hd 5, Trk 341 |
| 13 | Hd 5, Trk 682 | Hd 5, Trk 1023 |
| 14 | Hd 6, Trk 0 | Hd 6, Trk 341 |
| 15 | Hd 6, Trk 682 | Hd 6, Trk 1023 |
| 16 | Hd 7, Trk 0 | Hd 7, Trk 341 |
| 17 | Hd 7, Trk 682 | Hd 7, Trk 1023 |
| 18 | Hd 8, Trk 0 | Hd 8, Trk 341 |
| 19 | Hd 8, Trk 682 | Hd 8, Trk 1023 |
| 20 | Outer Radius Write Current | |
| 21 | Inner Radius Write Current | |
| 22 | Drive Configuration Data - Byte 1 | |
| 23 | Drive Configuration Data - Byte 2 | |
| 24–30 | Unused | |
| 31 | Checksum Byte | |

WRITE CURRENT

In the present invention, when start up is initiated by the host computer connected to the disk drive 18, a signal is sent to the microprocessor 12 that causes the read/write head(s) 26 to move to the guard bands and read the adaptive information stored thereon. This adaptive information is read, as controlled by the R/W LSI 10, through a preamplifier 28 to a slimming circuit of a conventional design or a design of the present invention, if desired, and is stored in solid state memory device (not shown) associated with the microprocessor 12. The solid state memory devices are preferably random access memory (RAM) in form. Upon the receipt of a data recording or "write" command from the host computer, the particular location on a particular disk is indicated. The servo LSI 16 has logic in the form of a pulse width modulation (PWM), to convert the write command (that is in digital form) to an analog form. The microprocessor 12 calculates the correct or optimum write current level for the particular location on the particular disk by utilizing the algorithm stored in the solid state memory along with the two bytes of write current data also stored in the solid state memory device. With the aid of a write select control 30 and a write current control 32 the function of which are to buffer and control the write current and to disable write functions during abnormal or fault conditions. the optimum write current level is determined and the write command, now in analog form, is passed through a R/W preamplifier 34 and onto the disk 22 via the particular head 26. The particular write current level utilized can vary from location to location linearly, exponentially, or step-wise, as desired.

SLIMMING

In the present invention, when start up is initiated by the host computer the adaptive information is read and stored, as described above. When a read command is initiated, the particular head 26 moves to the designated data track on the particular disk 22. The R/W LSI 10 in conjunction with the microprocessor 12 determine the correct slimming constant to be utilized for the particular location, as well as the particular head and disk combination. This determination can be made by calculating a different slimming constant for any location or by finding the correct slimming constant from a table of possible values stored in the solid state memory devices. Specifically, the data is read from the disk 22 and passes through the preamplifier 28 to the pulse slimmer 36, which acts as an amplitude filter, and to a data pulse detector 38 and filter 40. The data pulse detector 38 and filter 40 transfer and recover the digital data from the analog data read back signal from the disk through a process that consists of filtering out unwanted noise, differentiation and zero-cross detection. The "slimming" data is then passed back through the R/W LSI 10 to the host computer where it is utilized in other readback processes.

Whereas the present invention has been described in particular relation to the drawings attached hereto, it should be understood that other and further modifications apart from those shown or suggested herein, may be made within the scope and spirit of the present invention.

What is claimed is:

1. A method for compensating read and write operations in a disc drive, wherein the disc drive includes at least one rotating disc, includes a read/write head and means for positioning the read/write head at selected tracks for writing data to and reading data from data tracks on the disc, and includes a solid state memory coupled to a processor programmed to perform read and write operations, the method comprising the steps of:

writing adaptive information on a guard band of the disc, wherein the adaptive information includes read/write compensation parameters used to compensate read or write signals as a function of track location, and wherein said adaptive information includes data defining an outer radius write current value and an inner radius write current value; and then, reading the adaptive information from the guard band of the disc and storing the adaptive information in the solid state memory of the disc drive, and thereafter executing all read or write commands by the following steps of;

receiving a read or write command, wherein the read or write command includes a track location identifying a track on the disc where the read or write operation is to be performed;

positioning the read/write head at the track location where the read or write operation is to be performed;

determining a write current for use with a write operation at that track location from the adaptive information stored in the solid state memory by exponentially interpolating between the outer radius write current value and the inner radius write current value to determine the write current value at the track location; and compensating the write signal using said write current determined from said adaptive information.

2. A method for compensating read and write operations in a disc drive, wherein the disc drive includes at least one rotating disc, includes a read/write head and means for positioning the read/write head at selected tracks for writing data to and reading data from data tracks on the disc, and includes a solid state memory coupled to a processor programmed to perform read and write operations, the method comprising the steps of:

writing adaptive information on a guard band of the disc, wherein the adaptive information includes read/write compensation parameters used to compensate read or write signals as a function of track location, and further includes data defining slimming constants within ranges of tracks; and then, reading the adaptive information from the guard band of the disc and storing the adaptive information in the solid state memory of the disc drive, and thereafter executing all read or write commands by the following steps of;

receiving a read or write command, wherein the read or write command includes a track location identifying a track on the disc where the read or write operation is to be performed;

positioning the read/write head at the track location where the read or write operation is to be performed;

determining a slimming constant for use with a read operation at that track location from the adaptive information stored in the solid state memory, and further including the step of finding in which range of tracks the selected track location falls and using the corresponding slimming constant with the read operation at that track location; and compensating the read signal using the slimming constant determined from the adaptive information.

3. The method as recited in claim 2 wherein the disc drive includes multiple read/write heads, and wherein the adaptive information includes data defining slimming constants for each read/write head.

* * * * *